March 31, 1953   O. J. POUPITCH   2,632,929
MOLDING CLIP
Filed Nov. 3, 1949
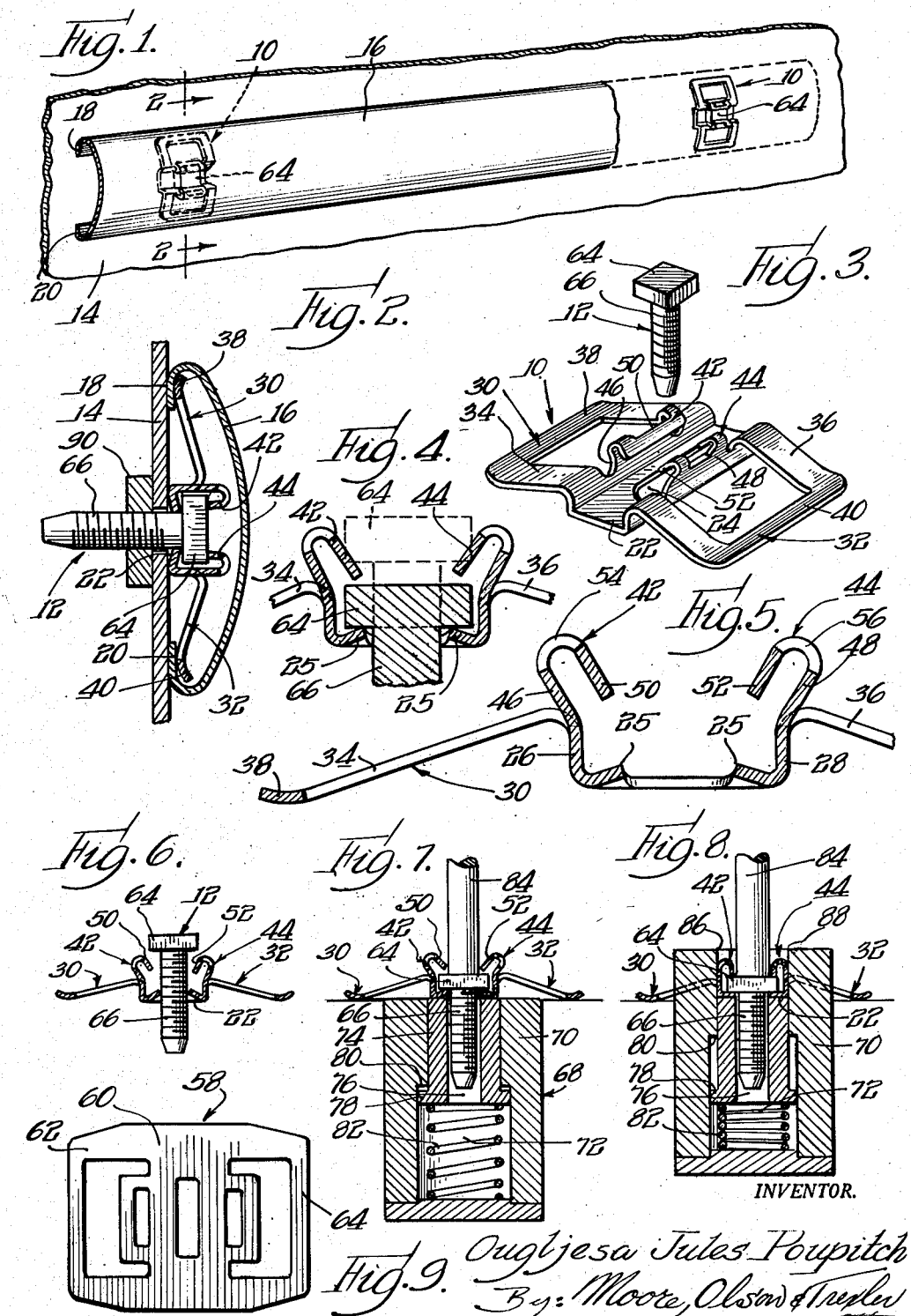
INVENTOR.
Ougljesa Jules Poupitch
By: Moore, Olson & Trexler
attys.

Patented Mar. 31, 1953

2,632,929

UNITED STATES PATENT OFFICE 2,632,929

MOLDING CLIP

Ougljesa Jules Poupitch, Chicago, Ill., assignor to Illinois Tool Works, Chicago, Ill., a corporation of Illinois Application November 3, 1949, Serial No. 125,329

5 Claims. (Cl. 24—73)

This invention relates generally to fastening and mounting devices, and is directed more particularly to a fastener unit for securing molding trim and other like objects to apertured work pieces.

Various types of fastening devices have been used heretofore for the purpose of securing molding trim or strips in position on automobile bodies and similar work pieces. The fasteners used to hold this ornamental trim in position generally comprise a head portion which engages the molding trim and a shank or stud portion which engages the automobile body. Certain pieces of the ornamental molding trim are relatively long and are often warped and distorted so that it is necessary to secure adjustment between the trim and the automobile body with a minimum of distortion of the molding. Furthermore, the holes formed in the automobile body to receive the shank of the fastener are often not aligned, hence requiring adjustment between the fastener shank and the molding trim if the trim is to be properly aligned with respect to the automobile body. These required adjustments between the molding trim and the automobile body have been secured heretofore by forming oversized or elongated apertures in the automobile body in which the fastener shank is mounted, or by having a deformable clip to engage the molding trim, or by bending the mounting. Manufacturers do not like to provide special holes whose formation is time consuming and costly and do not like the misalignment between the automobile body and the molding trim which results from bending the trim.

The present invention contemplates providing a fastener unit in which the shank or stud portion is adjustable with respect to the molding engaging head portion. This fastener construction makes it possible to compensate for hole misalignment and the formed molding strips when mounting the strips on an automobile body.

Accordingly, it is an important object of the present invention to provide a molding clip or fastener of the type described which comprises a molding engaging head having a cage formed thereon and a shank or stud which is loosely and captively retained by the cage.

More particularly it is an object of the present invention to provide a molding clip of the type described in which the head and the shank or stud are shiftable relative to each other whereby to provide adjustment between the molding trim engaged by the head and the work piece to which the trim is applied.

Another object of the present invention is to provide a molding clip head which is adapted to engage a molding trim and which has formed thereon means floatingly and captively to retain a stud or shank fastener element.

Still another object of the present invention is to provide a fastener unit which is easily assembled and which is more economical in construction.

The foregoing objects and advantages will be more apparent from the following detailed description when considered in connection with the accompanying drawing wherein:

Figure 1 is a perspective view of a molding strip secured to a work piece by means of a fastener of the type which is the subject of the present invention;

Figure 2 is an enlarged cross sectional view of the assembly shown in Figure 1 as seen in the direction of the arrows along the line 2—2 of Figure 1;

Figure 3 is an enlarged perspective view of the present invention illustrating a bolt as the stud or shank member in position for assembly with the head portion;

Figure 4 is an enlarged partial view in cross section showing the bolt and head portion in the assembled position;

Figure 5 is a partial enlarged view in cross section of the head portion;

Figure 6 is a view in cross section of a bolt and head member in partial assembled position preparatory to assembly by a second form of assembly operation;

Figure 7 shows the stud and head portions shown in Figure 6 positioned in an assembly die after the first step of the assembly operation;

Figure 8 shows the assembly of Figure 6 at the end of the final step of the assembly; and, Figure 9 is a plan view of the stamped sheet metal blank from which the head portion of Figures 1-7 is formed.

Referring now to the drawing wherein like numerals have been employed to designate similar parts throughout the various figures, it will be seen that one embodiment of the molding clip or fastening device contemplated by the present invention is shown in Figures 1-8 inclusive and comprises generally a head portion 10 and a shank or stud portion 12.

In Figure 1 two of the fastening clips are shown applied to a work piece or panel 14 with the head portion 10 engaging a molding strip 16 along the inturned flanges 18 and 20 thereof.

The head portion 10 is a one-piece sheet metal construction. It consists of a rectangularly shaped central body portion 22 in which is formed an elongated slot or aperture 24, the long axis of the slot lying in the direction of the longest side of the central body portion 22. As may be seen in Figures 4, 5 and 6, the edges 25 of the slot 24 along the long side thereof are bent upwardly out of the plane of the body portion 22 for a purpose which will be described hereinafter. Formed on the longer edges of the body portion 22 are a pair of upstanding walls 26 and 28 which are disposed substantially at right angles with respect to the plane of the body portion 22.

A pair of resilient arms 30 and 32 are formed integral with and extend laterally from the upstanding walls 26 and 28 respectively. The resilient arms 30 and 32 are generally rectangular in shape and consist of a pair of bendable members 34—34 and 36—36 respectively which at one end are formed integrally with the wall portions 26 and 28 respectively and which at their outer ends are connected by end strips 38 and 40 which extend substantially parallel to the longest edge of the body portion 22. The bendable members 34 and 36 extend outwardly at an acute angle with respect to the wall portions 26 and 28 and are of such a length that the end strips 38 and 40 extend across and beyond the plane of the body portion 22. As may be best seen in Figure 2 the end strips 38 and 40 engage the inner side of the inturned flanges 18 and 20 of the molding strip 16 and for this reason the end strips 38 and 40 are curved upwardly to better fit the above mentioned flange portions. The curved shape of the end portions 38 and 40 also facilitates placement of the molding strip 16 upon the head 10 by providing line contact between the inturned flanges of the molding strip and the end portions.

A pair of stud engaging holding arms 42 and 44 are formed integral with the wall portions 26 and 28 and are disposed between the bendable members 34—34 and 36—36 respectively. The portions 46 and 48 of the holding arms 42 and 44 which are connected to the wall portions 26 and 28 are inclined outwardly away from each other and from the central body portion 22. These portions 46 and 48 are curved inwardly at their upward ends and are reversely bent to form bolt engaging fingers 50 and 52 which are aligned substantially parallel with respect to the portions 46 and 48. The holding arms 42 and 44 have portions thereof removed at 54 and 56 along the bend line in order to make the head gripping fingers 50 and 52 more resilient. Holding arms 42 and 44 in cooperation with the central body portion 22 form a cage which is adapted to loosely and captively retain the head of a stud member as will be explained more fully hereinafter.

The head member 10 is formed from sheet metal by first stamping a blank 58 such as is shown in Figure 9. The central portion 60 of the blank 58 will provide the central portion 22 of the finished clip and the laterally extending U-shaped ends 62 and 64 will be formed into the resilient arms 30 and 32. It is seen from Figure 9 that the stud engaging arms 42 and 44 are formed from material within the end portions 62 and 64, and thus little scrap is produced in making the head 10.

After the blank 58 is stamped, it is shaped into the form shown in Figures 3 and 5. The form of the invention illustrated in the drawings utilizes bolt 12 to provide the shank or stud portion of the fastener. This bolt 12 comprises a generally square head 64 and a threaded shank portion 66. It is to be understood that various other types of fastening elements may be used in place of bolt 12, and it is therefore to be understood that the invention is not restricted to the use of such a fastener element.

Figure 4 illustrates one manner in which the bolt 12 is engaged by head member 10. To assemble bolt 12 and head member 10 the bolt is placed in the position shown in dotted lines in Figure 4 and then pressed firmly downwardly past the retaining arms 42 and 44. The resilient arms 42 and 44 will be urged outwardly toward the upstanding walls 26 and 28 to allow the head of bolt 12 to pass therebetween. These arms 42 and 44 will spring back to the position shown in Figure 4 after the head 64 has been urged to the position shown in solid lines. The body portion 22 and the ends of the resilient arms 42 and 44 and related parts form a cage which loosely holds the head 64 of the bolt in combination with the head 10. This construction prevents axial separation of bolt 12 and head 10 yet allows limited relative movement therebetween. The shank 66 of bolt 12 passes through the elongated slot 24 and is free to move within the slot.

Figures 6, 7 and 8 illustrate a second method of associating the bolt 12 with the head 10. The shank 66 is inserted through the slot 24 and then the resultant assembly is placed in a setting die which is generally designated by the numeral 68. Die 68 comprises a frame member 70 which is generally rectangular in horizontal cross section and is of such a length that it will fit between the bendable members 34—34 and 36—36. A slot or aperture 72 is cut in the frame member 70 and receives a movable die member 74. The cross sectional area of the upper portion of aperture 72 and the complementary cross sectional area of the die member 74 is such that they will receive that part of the body portion which extends the length of the stud engaging arms 42 and 44. Die member 74 has an axially extending bore 76 formed therein which accommodates the shank 66 of bolt 12 when the molding clip assembly is in the operative position preparatory to the setting operation. Formed on the lower end of die member 74 is a laterally extending flange 78 which abuts a shoulder 80 formed in the frame member 70 when the die member 74 is positioned in the uppermost position. A spring 82 is positioned between the bottom of the frame member 70 and the bottom of the die member 74; this spring urges the die member 74 in the upper position such that the flange 78 abuts the shoulder 80.

After the head 10 and bolt 12 have been placed in the position shown in Figure 7 a punch 84 or other suitable tool is pressed against the head 64 of bolt 12 and force is applied thereto forcing the die 74 down against the action of spring 82. The upstanding portions of frame 70 will pass through the aperture formed in the resilient arms 30 and 32 and the inner edges 86 and 88 of the frame 70 will be forced against the outwardly projecting portions 46 and 48 of the holding arms 42 and 44. As punches 46 and 48 are forced inwardly the bolt engaging fingers 50 and 52 will be forced downwardly against the head 64 of bolt 12. When the force applied to punch 84 is released, spring 82 will move the die member 74 and the assembled molding clip to the uppermost position. As can be best seen in Figure 2 the bolt 12 will be securely held so as to prevent axial separation between the head 10 and the bolt 12 by the action of the holding arms 42 and 44. Bolt 12 however will be capable of moving transversely within the slot 24 to allow adjustment between the head 10 and the bolt 12. The open structure of the resilient arms 30 and 32 makes the use of the setting die 68 feasible.

Figure 2 is a detailed illustration of the manner in which the present invention is used to secure a molding strip 16 to a workpiece 14. After the head 10 and bolt 12 have been assembled into a unit by one of the methods described above, the head 10 is placed within the molding strip 16 in the manner shown in Figure 2. In this position the end strips 38 and 40 of the resilient arms 30 and 32 lie against the inner edge of the inturned flanges 18 and 20 of the molding strip 16. The shank 66 of bolt 12 is then inserted through suitable apertures formed in the workpiece 14 and a nut 90 is threaded upon the thread bearing shank 66. The molding strip 16 is adjusted with respect to the workpiece 14 by shifting the bolt 12 with respect to the elongated slot 24 in the head 10. Since the end strips 38 and 40 of the head 10 normally extend beyond the plane of the body portion 22, the resilient arms 30 and 32 will be under compression when the nut 80 is screwed on tightly as illustrated in Figure 2. The compression in arms 30 and 32 will resiliently hold the molding strip 16 in position against the workpiece 14. As nut 90 is screwed on more tightly the lower edge of the head 64 of bolt 10 will engage the upturned edges 25 of aperture 24 and will force these upturned edges downwardly. The tension set up in the upturned edges 25 urging the head 64 of bolt 12 away from workpiece 14 will tend to exert a lock washer action and thus help retain the nut 90 in position on the shank 66. The molding strip 16 will therefore be held resiliently in position and the lock washer effect of the head 10 will eliminate inadvertent loosening of the nut 90 and thus eliminate any tendency to cause noises by rattling.

From the foregoing it will be apparent that the present invention contemplates a two-piece molding fastener or clip of improved practical design. The head portion of the clip is made by the practice of conventional stamping and forming methods which are essentially scrapless and very economical. The particular design and structure of the head allows the use of the special tools described for urging the stud retaining arms into a position which prevents axial separation of the bolt and head. Since the head and the stud of the molding strip are readily shiftable with respect to each other, the use of this molding clip provides ready adjustment between the molding strip and the work piece to which it is applied.

While certain specific structural details have been disclosed herein for the purpose of illustrating certain practical embodiments of the invention, it will be understood that other modifications and changes may be made without departing from the spirit and scope of the appended claims.

I claim:

1. A sheet metal clip member for a fastener unit comprising a substantially rectangular body portion having an aperture therein, a pair of upstanding walls spaced laterally outwardly from opposite edges of the aperture and extending upwardly from opposed sides of said body portion, work engaging arms formed integral with and extending laterally and downwardly away from the upper margin of the walls of said body portion, and stud engaging members extending from the vicinity of the upper margins of said walls inwardly toward each other, said stud engaging members being spaced above said body portion to form with said walls a cage, said cage being adapted captively to retain a headed stud when the shank of said stud is inserted through said aperture.

2. A sheet metal clip member of the type set forth in claim 1, wherein said stud engaging members are struck out from within the margins of said work engaging arms.

3. A sheet metal clip member of the type set forth in claim 1 wherein the free ends of said work engaging arms terminate in a plane below the plane of said body portion.

4. A sheet metal clip member of the type set forth in claim 1 wherein the aperture provided in the rectangular body portion is elongated in the direction of extent of said walls.

5. A sheet metal clip member of the type set forth in claim 1 wherein said stud engaging members consist of a pair of reversely bent arms, the free ends of such arms terminating a predetermined distance above the body portion of the clip member and being spaced from each other to permit insertion of a threaded fastener member therebetween.

OUGLJESA JULES POUPITCH.

REFERENCES CITED

The following references are of record in the file of this patent:

UNITED STATES PATENTS

| Number | Name | Date |
| --- | --- | --- |
| 1,405,994 | Fisher | Feb. 7, 1922 |
| 1,694,580 | Carr | Dec. 11, 1928 |
| 1,732,992 | Spiro | Oct. 22, 1929 |
| 1,768,505 | Carr | June 24, 1930 |
| 2,311,410 | Meyer | Feb. 16, 1943 |
| 2,330,372 | Mittendorf | Sept. 28, 1943 |
| 2,333,386 | Murphy | Nov. 2, 1943 |
| 2,571,786 | Tinnerman | Oct. 16, 1951 |